United States Patent
Stephan et al.

(10) Patent No.: US 12,113,719 B2
(45) Date of Patent: Oct. 8, 2024

(54) METHOD FOR ALLOCATING RESOURCES OF A NETWORK INFRASTRUCTURE

(71) Applicant: Orange, Issy-les-Moulineaux (FR)

(72) Inventors: Emile Stephan, Chatillon (FR); Frédéric Fieau, Chatillon (FR); Gaël Fromentoux, Chatillon (FR)

(73) Assignee: ORANGE, Issy-Les-Moulineaux (FR)

( * ) Notice: Subject to any disclaimer, the term of this patent is extended or adjusted under 35 U.S.C. 154(b) by 2 days.

(21) Appl. No.: 17/597,185

(22) PCT Filed: Jun. 10, 2020

(86) PCT No.: PCT/EP2020/066116
§ 371 (c)(1),
(2) Date: Dec. 28, 2021

(87) PCT Pub. No.: WO2020/260025
PCT Pub. Date: Dec. 30, 2020

(65) Prior Publication Data
US 2022/0278944 A1    Sep. 1, 2022

(30) Foreign Application Priority Data

Jun. 28, 2019 (FR) ...................................... 1907172

(51) Int. Cl.
*H04L 41/342* (2022.01)
*H04L 41/0803* (2022.01)
(Continued)

(52) U.S. Cl.
CPC .......... *H04L 47/82* (2013.01); *H04L 41/0803* (2013.01); *H04L 41/342* (2022.05); *H04L 41/40* (2022.05); *H04L 41/5051* (2013.01)

(58) Field of Classification Search
CPC ... H04L 47/82; H04L 41/0803; H04L 41/342; H04L 41/40; H04L 41/12; H04L 43/0817; H04L 41/5051
See application file for complete search history.

(56) References Cited

U.S. PATENT DOCUMENTS 9,450,817 B1 * 9/2016 Bahadur ............. H04L 41/0806
11,057,264 B1 * 7/2021 Ghare ................. H04L 41/0654
(Continued)

OTHER PUBLICATIONS

English translation of the International Written Opinion dated Jul. 9, 2020 for corresponding International Application No. PCT/EP2020/066116, filed Jun. 10, 2020.
(Continued)

*Primary Examiner* — Schquita D Goodwin
*Assistant Examiner* — Joseph M Cousins
(74) *Attorney, Agent, or Firm* — David D. Brush; Westman, Champlin & Koehler, P.A.

(57) ABSTRACT

A method for allocating resources of a network infrastructure in order to provide a telecommunication service is disclosed. The method includes receiving, by a resource orchestrator, a request to instantiate virtualized functions on servers; determining servers to be allocated and resources of the network infrastructure enabling connectivity between the servers, based on the instantiation request; sending, to the determined resources, a configuration request enabling connectivity between the determined servers; and sending, to the determined servers, a request to allocate computing means on the determined servers.

10 Claims, 3 Drawing Sheets

(51) Int. Cl.
- *H04L 41/40* (2022.01)
- *H04L 41/5051* (2022.01)
- *H04L 47/70* (2022.01)

(56) References Cited

U.S. PATENT DOCUMENTS

| | | |
|---|---|---|
| 2016/0380832 A1 | 12/2016 | Purushotham et al. |
| 2017/0279672 A1* | 9/2017 | Krishnan ............ G06F 9/45558 |
| 2018/0063000 A1 | 3/2018 | Wu et al. |
| 2018/0191637 A1 | 7/2018 | Yang et al. |
| 2019/0312772 A1* | 10/2019 | Zhao .................... G06F 9/5011 |
| 2020/0244546 A1* | 7/2020 | Tidemann ........... H04L 41/5009 |
| 2020/0319906 A1* | 10/2020 | Sankaran ............ H04L 43/0852 |

OTHER PUBLICATIONS

International Search Report for International Application No. PCT/EP2020/066116, mailed on Jul. 9, 2020.

* cited by examiner

METHOD FOR ALLOCATING RESOURCES OF A NETWORK INFRASTRUCTURE

CROSS-REFERENCE TO RELATED APPLICATIONS

This application is filed under 35 U.S.C. § 371 as the U.S. National Phase of Application No. PCT/EP2020/066116 entitled "METHOD FOR ALLOCATING RESOURCES OF A NETWORK INFRASTRUCTURE" and filed Jun. 10, 2020, and which claims priority to FR 1907172 filed Jun. 28, 2019, each of which is incorporated by reference in its entirety.

BACKGROUND

Field

This present disclosure is in the field of telecommunications networks implemented based on virtualized architectures. This present disclosure aims to improve the instantiation of virtualized functions in a server infrastructure, said server infrastructure sharing network resources.

Description of the Related Technology

The telecommunications sector is at the heart of a digital transformation that relies on emerging technologies such as the virtualization of network functions, consisting of decoupling network functions from dedicated physical devices in order to deploy network functions in storage spaces.

A virtual network function is considered to be a set of software components (VNF-"Virtual Network Functions"), each component having to be executed on a server such as a virtual machine within the "virtualized" architecture. The deployment of a network service established based on VNFs therefore consists of instantiating the various components of the VNFs in virtual machines having the resources necessary for executing the VNFs and therefore for proper implementation of the service. These resources-whether computing, storage, memory, and network resources—are provided by the infrastructure hosting these virtual machines.

The deployment of network services, to customers of the operator of a telecommunications network or for the operator itself, therefore involves the instantiation of virtualized functions in virtual machines.

Certain network functions have heavy constraints in terms of latency and must therefore be deployed as close as possible to the user. In certain cases, these constraints lead the telecommunications operators to review their infrastructures in order to meet these requirements, by massively distributing their data centers so as to be present in sites positioned at the edge of the network (commonly called "edge computing").

This distribution of network functions makes it possible to offer an improved quality of service for end users as well as for corporate customers and to meet the strict requirements of certain network functions. These data centers distributed at the edge of the network have limited capacities in terms of resources, particularly compared to the large data centers deployed by the main players in the field.

The ecosystem of virtualized functions requires new management and orchestration techniques in order to achieve the performance required.

Orchestration aims to automate the configuration, coordination, and management of complex computing systems, particularly when said computing systems are virtualized. Orchestration is involved when things need to take place in a certain order. The Kubernetes Orchestrator is widely deployed at a large scale and is used in both test and production environments.

In the prior art, the instantiation of VNFs is based on an allocation of servers by a resource orchestrator. However, orchestrators of the prior art can allocate servers satisfying certain criteria (such as the overall computing power or such as the storage capacity) but cannot verify that the allocated servers can communicate with each other in a satisfactory manner or cannot guarantee a network quality of service between these servers.

The purpose of this present disclosure is to provide improvements to the state of the art.

SUMMARY OF CERTAIN INVENTIVE ASPECTS

This present disclosure proposes a method for allocating resources of a network infrastructure of an operator in order to provide a telecommunication service.

The method comprises:
receiving, by a resource orchestrator, a request to instantiate virtualized functions on servers of the network infrastructure;
determining servers to be allocated and resources of the network infrastructure enabling connectivity between said servers, based on the request to instantiate said virtualized functions;
sending, to the determined resources of the network infrastructure, a configuration request enabling connectivity between said determined servers;
sending, to the determined servers, a request to allocate computing means on said determined servers.

It is thus possible to ensure connectivity between the servers allocated by the orchestrator, for example. This connectivity thus meets the requirement formulated in the instantiation request.

A server may be a physical computing device (e.g. a computer) or software, for example such as a container, a virtual machine, an operating system, an application, or a pod.

An instantiation request may be, for example, a request from a user (or from a customer server or from an OSS/BSS-"Operational Support System" and "Business Support System") indicating a customer requirement such as the desire to allocate resources enabling a distributed calculation of several megaflops or making it possible to act as a web server able to respond to hundreds of simultaneous requests.

The connectivity may be the existence of a network link, the availability of a network link, the availability of bandwidth on a network link, the latency of a network link, etc.

The configuration request intended for determined resources of the network infrastructure thus makes it possible to configure these resources to ensure that the requirement expressed in the instantiation request remains satisfied over time. For example, it is possible to configure a network router to reserve a bandwidth between two servers in a fixed manner or to ensure a given quality of service between the two servers. It is also possible to configure certain firewalls to ensure security between two servers (such as reserving or configuring a VLAN).

The request to allocate computing means on said determined servers can take the form of a request to reserve capacity on servers.

A resource orchestrator allows resources to be allocated in order to obtain an overall status of the servers before instantiating virtualized functions on virtual machines.

In one embodiment, the method may further comprise sending a configuration request to a resource manager of the network infrastructure. Sending a configuration request to the determined resources of the network infrastructure may be based on said configuration request to a resource manager of the network infrastructure.

The resource manager can thus reserve resources in the network in order to establish connectivity between the servers, such as network links or bandwidth for example. As a result, it is possible to provide connectivity between the allocated servers and also between the allocated servers and the end customers.

In another embodiment, the determination of servers to be allocated and of resources of the network infrastructure enabling connectivity between said servers based on the request to instantiate said virtualized functions may comprise, in order:
  determining servers to be allocated, and
  determining resources of the network infrastructure enabling connectivity between said determined servers, based on the request to instantiate said virtualized functions.

After the network is configured by the resource manager, the orchestrator can allocate servers in the network. The servers to be allocated may, for example, be user terminals or servers which have sufficient computing power and storage capacity, which are geographically close, etc. Infrastructure resources are configured to allow a connection between the servers. The resources can therefore be routers, switches, etc. and are determined based on the selected servers.

The determination of servers to be allocated and of resources of the network infrastructure enabling connectivity between said servers based on the request to instantiate said virtualized functions may comprise, in order:
  receiving, by the resource orchestrator, a status of the network infrastructure;
  determining servers to be allocated based on the status of the network infrastructure received, the status of the network infrastructure enabling connectivity between said servers based on the request to instantiate said virtualized functions, and
  determining resources of the network infrastructure enabling said connectivity.

The received status of the infrastructure may be a basic or detailed map of the network infrastructure and may comprise basic geographical indications, the existence of a network link, the availability of a network link, the availability of a bandwidth on a network link, etc. The servers to be allocated are selected based on this information and take into account the status of the network. To satisfy, for example, a latency requirement of the customer, the servers (e.g. computation server) and network resources (e.g. router, firewall) will be allocated geographically close to the customer or to the users of the service to be implemented.

In one embodiment, at least one of the determined resources of the network infrastructure of a configuration request may be a firewall or a router.

The purpose of the determined resources of the network infrastructure is to establish a connection between the servers and ensure their operation. The resources can thus be a router for managing the connection between the servers or a firewall for defining what types of communications are authorized on the network.

At least one of the allocated servers can be a computation server or a data storage server or a user terminal.

To execute the customer request, servers with sufficient computing power and storage capacity may be required.

The network status may comprise information relating to network link load or computing load or information about connectivity between servers.

To avoid server overload problems (which for example can slow down the current processes), the allocation of computing means on servers and resources can be chosen according to the network link load or the computing load. The status of the network can therefore comprise detailed information about the network link load (e.g. transmission rate) or computing load (e.g. a router may be at its limit processing capacity in terms of processor) or information about connectivity between servers (e.g. what bandwidth is available).

The instantiation request may comprise a request for availability or computing power, throughput or latency.

To manage the workload, available servers with satisfactory properties may be required. The instantiation request may therefore request information relating to computing power (e.g. number of flops), throughput (e.g. number of bytes per second), or latency (e.g. minimum response time).

The connectivity may be information about bandwidth, latency, security level, or quality of service.

The quality of the connectivity, i.e. communication between servers, depends on several parameters such as bandwidth (e.g. 3G or 4G) and latency. Depending on the type of service envisaged, the quality of service may lie in the throughput, delay, and/or availability.

The allocation of computing means on servers can be done according to the virtualized functions to be instantiated.

If the customer request comprises the processing of data close to the source (e.g. for "real-time" computer processing), servers can be allocated at nearby locations in order to decrease latency or at more distant locations if the latency times specific to the links (which may depend on the technology used) are lower. If the customer request comprises high computing power, servers with such properties can be chosen.

The sending to the determined servers can be done subsequently to a request to allocate computing means on said determined servers.

The resource orchestrator can thus determine the servers to allocate based on the network status provided by the resource manager and can therefore issue a request to these servers.

The method can be executed at the edge of the network.

It is thus possible to reduce the volumes of data in transit, the resulting traffic, the distance traveled (e.g. to reduce transmission costs), or the latency.

This present disclosure also relates to a device (e.g., an orchestrator) suitable for implementing the method described above.

This present disclosure thus relates to a device for allocating resources of a network infrastructure for the instantiation of virtualized functions on servers.

The device comprises:
  a communication interface for receiving a request to instantiate said virtualized functions by a resource orchestrator
  an electronic circuit suitable for determining the servers to be allocated and the resources of the network infrastructure enabling connectivity between said servers, based on the request to instantiate said virtualized functions;

a communication interface for sending, to the determined resources of the network infrastructure, a configuration request enabling connectivity between said determined servers a communication interface for sending, to the determined servers, a request to allocate computing means on said determined servers.

This present disclosure also relates to a computer program comprising instructions for implementing the method described above, when this program is executed by a processor.

This program can use any programming language (for example, an object-oriented language or the like), and can be in the form of an interpretable source code, a partially compiled code, or a fully compiled code.

Figure 3:
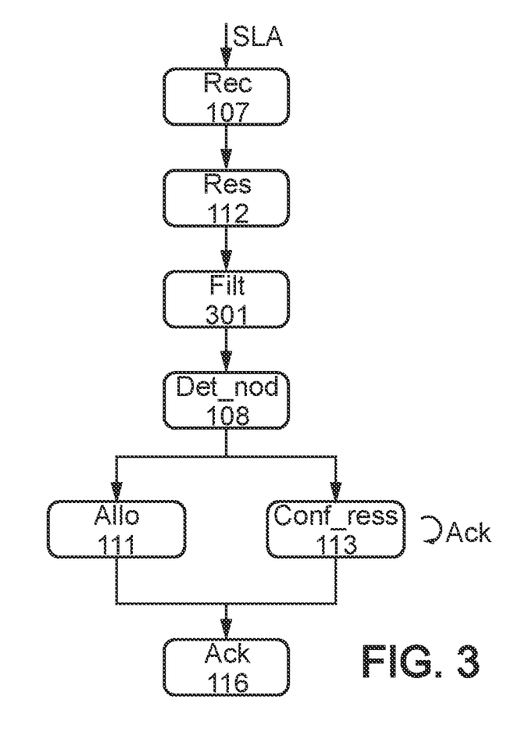
FIG. 3 presents a flowchart showing the method for allocating resources of an operator's network infrastructure, for the instantiation of virtualized functions on servers, according to a first embodiment.

FIG. 3, described in detail below, can form the flowchart for the general algorithm of such a computer program.

Another aspect relates to a non-transitory storage medium for a computer-executable program, comprising a set of data representing one or more programs, said one or more programs comprising instructions for, during the execution of said one or more programs by a computer comprising a processing unit operatively coupled to memory means and to an input/output interface module, executing all or part of the method described above.

BRIEF DESCRIPTION OF THE DRAWINGS

Other features and advantages of the present disclosure will be more clearly apparent upon reading the following description of specific embodiments, given as simple illustrative and non-limiting examples, and the accompanying drawings, in which.

DETAILED DESCRIPTION OF CERTAIN ILLUSTRATIVE EMBODIMENTS

The method for allocating resources of a network infrastructure (e.g. of an operator) for the instantiation of virtualized functions on servers can be implemented according to several embodiments.

In the remainder of the description, several non-limiting embodiments are presented.

Figure 1:
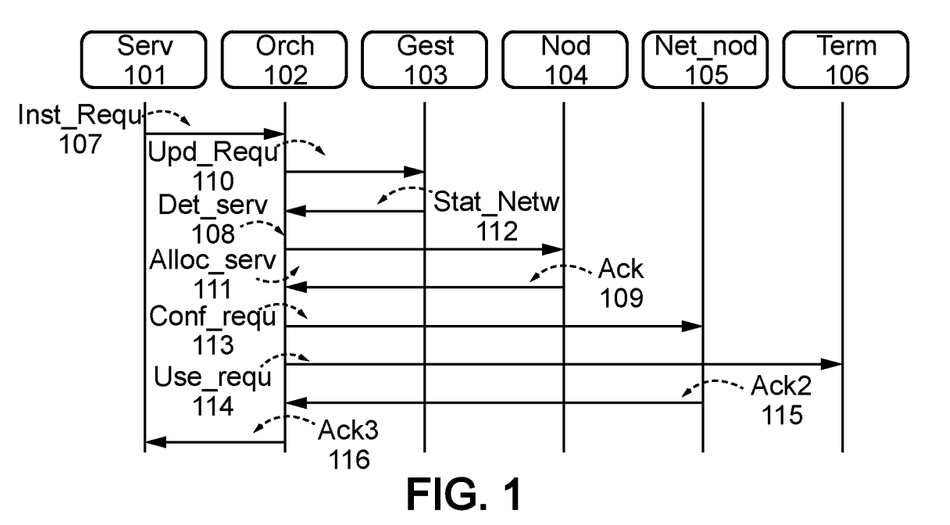
FIG. 1 presents a first embodiment.

FIG. 1 presents a first embodiment.

In this embodiment, a resource orchestrator 102 is configured to receive, from a server 101 (e.g. managed by an operator), a request 107 to instantiate virtualized functions on servers 104: this instantiation request 107 can correspond to a customer's SLAs.

The SLAs (for "service level agreement") are most often used by an operator to implement the infrastructure necessary for the customer's requirements.

SLAs are also used to determine an update to be performed on the network to allow connectivity between said servers 104.

Once the instantiation request 107 has been received, a network update request 110 is sent to a network resource manager 103 (e.g. SDNC for "Software Defined Network Controller") by the resource orchestrator 102.

This network update request 110 aims to obtain from the network resource manager a basic or detailed map of the network infrastructure which would be relied upon to meet the customer's request. This request can therefore comprise basic geographical indications (e.g. France, if the customer's request aims to deliver a service in France or e.g. European 4G network if the service targeted by the customer only targets mobile data users).

Once this request 110 has been sent, the network resource manager 103 (e.g. SDNC) provides the status of the requested network in a message 112 (directed to the resource orchestrator).

For example, this status may comprise a list of network links where less than 50% of the bandwidth is in use, a list of network links satisfying a predetermined latency, etc.

The message may well contain binary information (e.g. 0 if the network is ready or 1 if the network cannot satisfy the request).

If the network is ready to satisfy the request 107, the resource orchestrator determines the servers to be allocated 108 and then issues a request 111 to allocate computing means on determined servers 104.

Furthermore, if the network status received by the message 112 indicates that certain parts of the network infrastructure do not allow the request 107 to be satisfied (e.g. the speeds on certain links are too limited), it is possible to identify beforehand servers (e.g. connected to these links having a limited speed) that should not be allocated. Indeed, the orchestrator 102 can take into account the status of the network in order to prohibit the selection of certain servers or at least to assign them a "weight" in order to reduce the chance of selecting these servers.

This embodiment may optionally include an acknowledgment step 109 confirming the allocation of computing means on the determined servers.

The resource manager then issues a configuration request 113 to the resources 105 of the network infrastructure enabling connectivity between said determined servers. This request may or may not be relayed by the server 103.

This message 113 can thus comprise a list of determined servers 104, so that the best list of resources 105 of the network infrastructure to be configured (e.g. the network links between the determined servers) can be determined. The resources 105 of the network infrastructure to be configured may be determined using a routing algorithm, based for example on a Dijkstra's algorithm.

Optionally, the manager can also issue a configuration and/or use request 114 to a client terminal 106, fixed or mobile. Indeed, it may be useful to indicate to this client terminal 106 the various servers and the various resources of the infrastructure that will need to be called upon if this client terminal 106 wishes to use the proposed service (e.g. if the allocation request 107 is aimed at a video surveillance service, the client terminal 106 may have to be configured to be able to connect to the video offered by this video surveillance service).

An acknowledgment step 115 for the configuration of the determined resources may be provided.

Furthermore, in one particular embodiment, the proposed method may also comprise tests of the status of the servers after allocation and tests of the status of the resource manager (not shown in FIG. 1).

This embodiment may comprise a step of sending an acknowledgment message 116 originating from the resource orchestrator 102 and intended for the server 101 in order to indicate to it that its request 107 has indeed been taken into account.

In the general embodiment described in FIG. 1, the resource orchestrator can analyze the network status and, based on that status, can decide on a relevant allocation of servers. This analysis of the network status makes it possible to optimize and adapt the allocation of computing means on the servers to the customer's needs in a fine-tuned manner.

In this first embodiment, the resource orchestrator can execute complex tasks, such as analyzing the network status and deciding, based on the network status, the manner in which the servers are to be allocated. This makes it possible to optimize and adapt the allocation of computing means on the servers to the customer's needs in terms of throughput, latency, etc.

The second embodiment, described below, proposes a method for allocating computing means on servers without any step of verifying the network status. In this embodiment, a less complex orchestrator is possible than in the first embodiment, which reduces the duration of the method for instantiating virtualized functions.

Figure 2:
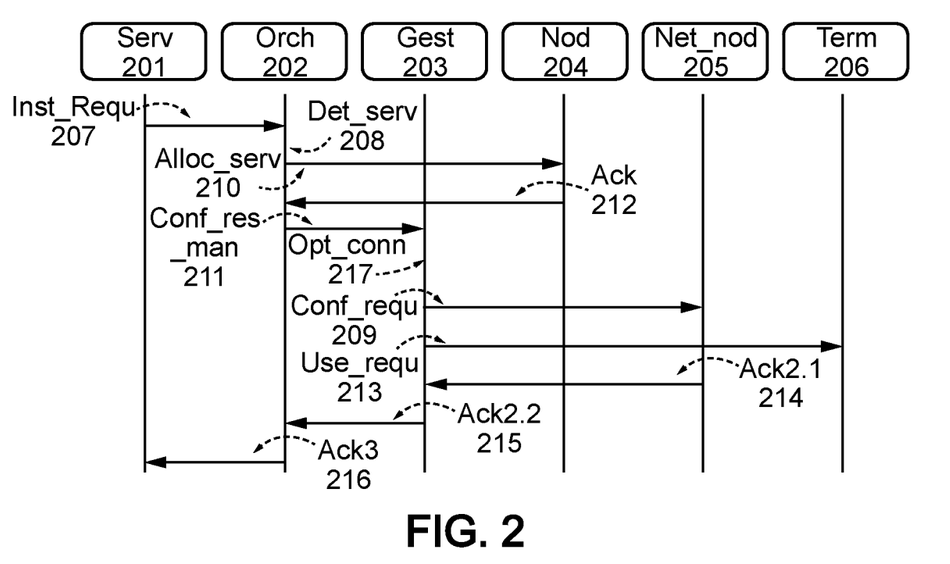
FIG. 2 presents a second embodiment.

FIG. 2 presents a second embodiment.

In this embodiment, a resource orchestrator 202 is configured to receive from a server 201 a request to instantiate virtualized functions: this instantiation request 207 may correspond to a quality of service request (or SLA) from a customer.

Once the instantiation request 207 has been received, which servers 204 to allocate are determined (step 208) based on the request 207 to instantiate said virtualized functions.

A request 210 to allocate computing means on the determined servers is then issued by the resource orchestrator 202.

The purpose of this allocation request is to prepare servers to meet the customer's request. This embodiment may optionally comprise an acknowledgment step 212 confirming the allocation of computing means on the determined servers.

It is also possible to provide for issuing a network configuration request 211 to a resource manager 203 in order to enable connectivity between the determined servers. Consequently, this request 211 may comprise a list of determined servers.

On the basis of this transmitted list of servers, and having knowledge of the network infrastructure, the resource manager can determine the network resources to be called upon in order to allow optimal connectivity 217 of the determined servers. Of course, it is possible for this last determination to be carried out directly by the orchestrator 202 if it has at its disposal certain information (e.g. topological) about the network. However, it is possible that the resource manager has at its disposal more precise information about the network status than the orchestrator (which would only have static information, such as the network map).

Furthermore, the configuration message 211 may include certain information from message 207 and thus carry indications as to the level of service requested by the customer. In this situation, the resource manager can determine the network resources to be configured in order to achieve this level of service (i.e. not necessarily enabling optimal connectivity).

In certain situations, it is possible that the resource manager cannot find a solution to satisfy the level of service requested by the customer (or quite simply to ensure connectivity, even weak, between the servers). In this case, it is possible to provide an alert message sent by the resource manager to the orchestrator so that the latter can propose new servers. The process is then repeated.

However, if network resources have been determined (i.e. a solution is found to ensure connectivity), the resource manager can send a configuration request 209 to the determined resources 205 of the network infrastructure and enabling connectivity between said determined servers.

The method may optionally comprise an acknowledgment step 214 confirming the configuration of the determined resources 205.

It is also possible to have a message 213 intended for terminals, similar to the message 114 described in relation to FIG. 1.

An acknowledgment step 215 for the configuration of the determined resources may be provided and a message may then be sent by the resource manager to the orchestrator.

In addition, in one particular embodiment, the proposed method may also comprise tests of the status of the servers after allocation and tests of the status of the resource manager (not shown in FIG. 2).

This embodiment may comprise a step of sending an acknowledgment message 216 originating from the resource orchestrator 202 and intended for the server 201 in order to indicate to it that its request 207 has indeed been taken into account.

These embodiments are not limiting, but only present examples to explain the present disclosure.

FIG. 3 is a flowchart of the method according to the first embodiment.

The resource orchestrator is configured to receive a request 107 for the instantiation of virtualized functions on servers.

The orchestrator is configured to receive a message 112 originating from the resource manager, containing the status of the network. This message may be received as a result of a network status request 110 by the resource orchestrator. In another embodiment, this message 112 is sent at a certain frequency from the manager and to the orchestrator.

Depending on the message 112 (and optionally message 107), it is possible to determine (step 301) certain configurations/allocations that are prohibited or unfavorable for the allocation. For example, if the customer request is to instantiate a service requiring very low latency, it is possible to exclude/filter out (or negatively weight) servers that cannot be connected by low latency links. Similarly, if the customer request is to have a high speed for its service, it is possible to exclude/filter out (or negatively weight) the servers connected by saturated links or links not having a technology allowing such a speed. In addition, if the customer request is to have significant security for its streams, it is possible to exclude/filter out (or negatively weight) the links that do not have routers supporting VLAN management or exclusion table management (or firewall).

Depending on the message 112 (and possibly depending on the filter/weighting performed in step 301), the orchestrator can determine (step 108) the servers to be allocated and the resources of the network infrastructure to configure.

This determination can be done simultaneously (i.e. the servers and the resources are determined at the same time, for example by solving an optimization problem having servers and resources as variables) or sequentially (i.e. the servers are determined beforehand, for example by solving an optimization problem having the servers as variables, the resources are then determined, for example by solving an optimization problem having the resources as variables and the determined servers as constraints).

Following the determination step (step 108), the servers are allocated (message 111) and the determined resources of the network infrastructure are configured (message 113).

One should note that the order between the allocation of computing means on the determined servers and the configuration of the determined network resources is irrelevant: these two steps can be carried out one after the other or even in parallel.

Acknowledgment steps may also be provided for these allocation and configuration steps.

Figure 4:
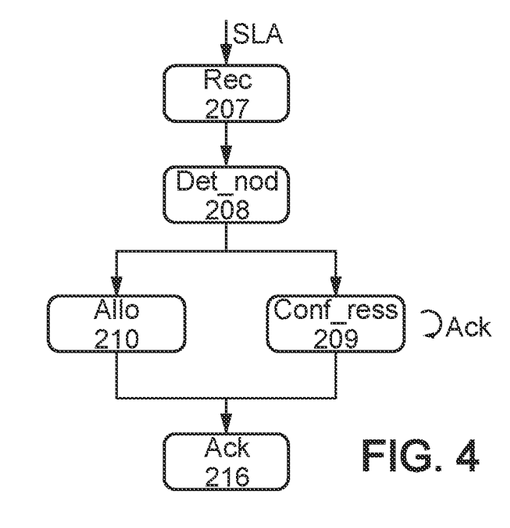
FIG. 4 presents a flowchart showing the method for allocating resources of an operator's network infrastructure, for the instantiation of virtualized functions on servers, according to a second embodiment.

In one particular embodiment, the proposed method may also comprise tests of the status of the servers after allocation and tests of the status of the resource manager (not shown in FIG. 4).

This embodiment may comprise a step of sending an acknowledgment message (messages 116) from the resource orchestrator 102 to the server 101 in order to indicate to it that its request 107 has indeed been taken into account.

FIG. 4 is a flowchart of the method according to the second embodiment.

The resource orchestrator is configured to receive a request 207 for the instantiation of virtualized functions on servers.

The orchestrator is configured to determine (step 208) the servers to be allocated and then the resources of the network infrastructure to be configured.

Following the determination step (step 208), the servers are allocated (message 210) and the determined resources of the network infrastructure are configured (message 209).

One should note that the order between the allocation of computing means on the determined servers and the configuration of the determined network resources is irrelevant: these two steps can be carried out one after the other or even in parallel.

Acknowledgment steps may also be provided for these allocation and configuration steps.

In one particular embodiment, the proposed method may also comprise tests of the status of the servers after allocation and tests of the status of the resource manager (not shown in FIG. 4).

This embodiment may comprise a step of sending an acknowledgment message (message 216) from the resource orchestrator 202 to the server 202 in order to indicate to it that its request 207 has indeed been taken into account.

Figure 5:
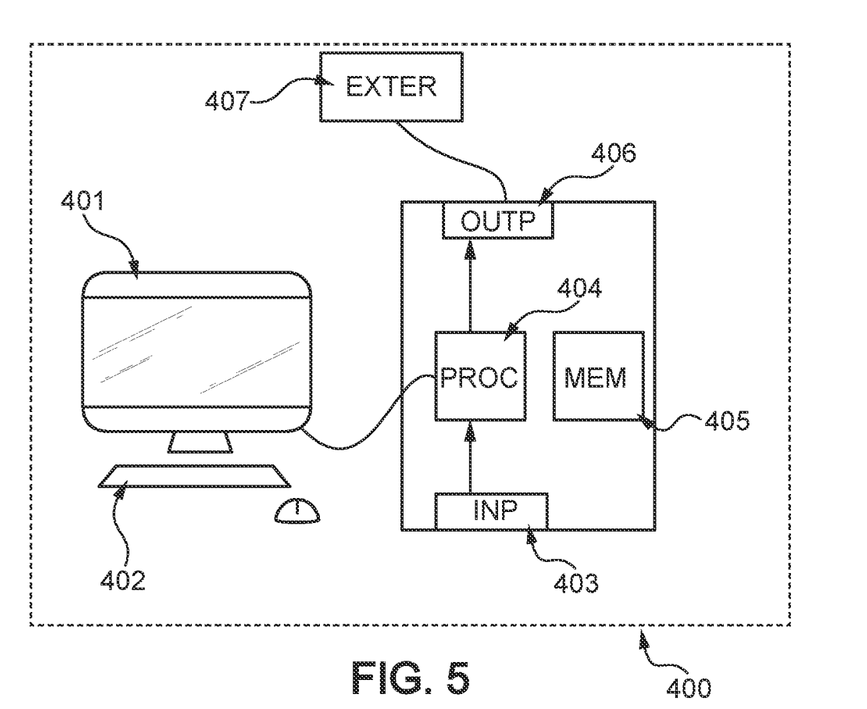
FIG. 5 presents a device suitable for implementing the present disclosure.

FIG. 5 describes a device 400 suitable for implementing a resource orchestrator. In this embodiment, the device 400 comprises a memory 405 for storing the instructions enabling the implementation of the method, the various messages received, and temporary data for carrying out the various steps of the method as described above.

The device further comprises an electronic circuit 404. This electronic circuit may be, for example:
- a processor capable of interpreting instructions in the form of a computer program, or
- a circuit board in which the steps of the method of the present disclosure are described in silicon, or else
- a programmable electronic chip such as an FPGA chip (for "Field-Programmable Gate Array"), a SOC (for "System On Chip"), or an ASIC (for "Application Specific Integrated Circuit").

SOCs or systems on chip are embedded systems that integrate all the components of an electronic system into a single chip.

An ASIC is a specialized electronic circuit that groups together functionalities tailored to a given application. ASICs are typically configured at the time of manufacture and can only be simulated by the user.

FPGA (Field-Programmable Gate Array) programmable logic circuits are electronic circuits that are reconfigurable by the user.

This device comprises an input interface 403 for receiving messages, and an output interface 406 for providing configuration or other messages controlling the servers to be instantiated or the network infrastructure resources to be configured 407. Finally, the computer may include, to allow easy interaction with a user, a screen 401 and a keyboard 402. Of course, the keyboard is optional, particularly in the context of a computer in the form of a server, for example.

Depending on the embodiment, the device 400 may be a computer, a computer network, an electronic component, or some other device including a processor operatively coupled to memory, as well as, depending on the chosen embodiment, a data storage unit, and other associated hardware elements such as a network interface and a media reader for reading a removable storage medium and writing to such medium (not shown in the figure). The removable storage medium may be, for example, a compact disc CD, a digital video/digital versatile disc DVD, a flash drive, a USB stick, etc.

Depending on the embodiment, the memory, the data storage unit, or the removable storage medium contains instructions which, when executed by the control circuit 404, cause this control circuit 404 to perform or control the input interface 403, output interface 406, data storage in memory 405, and/or data processing and processing the examples of implementing the proposed method described herein.

The control circuit 404 may be a component implementing the control of units 403, 405 and 406 of the device 400.

In addition, the device 400 may be implemented in software form, in which case it takes the form of a program executable by a processor, or in hardware form, such as an application specific integrated circuit ASIC, a system on chip SOC, or in the form of a combination of hardware and software elements, for example a software program intended to be loaded and executed on an electronic component described above, eg. an FPGA, a processor.

The device 400 may also use hybrid architectures, for example architectures based on a CPU+FPGA, a Graphics Processing Unit GPU, or a Multi-Purpose Processor Array MPPA.

Furthermore, the functional diagram shown in FIG. 3 and FIG. 4 is a typical example of a program in which certain instructions can be carried out with the device described. As such, FIG. 3 and FIG. 4 can correspond to the flowchart for the general algorithm of a computer program within the meaning of the present disclosure.

In one embodiment, the resource manager may be implemented by an SDNC or "Software Defined Network Controller".

In one embodiment, the orchestrator may be set up by Kubernetes, which is a platform for automating the instantiation of virtualized functions.

The present disclosure has many applications, particularly in the Internet of Things ("IoT"). The Internet of Things enables the Internet to interconnect with objects, places, and physical environments.

For example, in video surveillance of a room, it may be useful to indicate to a client terminal the different servers and the different infrastructure resources that will have to be called upon if this client terminal wishes to use the service offered. The client terminal may need to be configured in order to be able to connect to the video offered by this video surveillance service. Image retrieval for centralized computer processing (e.g. in real time) can be implemented by a choice of servers close to the client, which minimizes latency. In addition, direct connection to an insurance agency or sending an alert message to the police may be considered.

In another example, a vehicle connected via the Internet of Things allows automotive manufacturers and suppliers to develop new services. For example, remote geolocation and the recovery of stolen vehicles can be deployed using connected devices. Retrieval of vehicle data, such as brake wear, by a supplier can be useful for alerting the customer and automatically making an appointment at a garage. The present disclosure makes it possible to configure servers assigned to manufacturers dynamically according to the location of their customer fleet, to suppliers, and to the garage; to read and process the information acquired in real time; and to make an appointment at a garage that is geographically close.

In another example, this present disclosure enables better connectivity in a context of a customer VPN service. For example, if someone wishes to offer a VPN (or "Virtual Private Network") service to customers, it is possible to allocate computer resources close to customers and close to network exits (e.g. either a Web server or a point of interconnection with another network) and to ensure that the various links connecting the customer and the network exit have the correct characteristics (e.g. latency, throughput, security, etc.).

The list of these examples is non-exhaustive.

The invention claimed is:

1. A method of allocating resources of a network infrastructure in order to provide a telecommunication service, wherein the method comprises:
   receiving, by a resource orchestrator, a request to instantiate virtualized functions on virtual machines associated to servers, each server comprising a physical computing device;
   determining servers to be allocated, based on the instantiation request;
   determining resources of the network infrastructure enabling optimal connectivity between the servers, based on the instantiation request and on the determined servers, wherein at least one of the determined resources of the network infrastructure comprises at least one of a firewall, a switch and a router;
   sending, to the determined resources, a network configuration request enabling connectivity between the determined servers; and
   sending, to the determined servers, a request to allocate computing capacity on the determined servers.

2. The method according to claim 1, further comprising:
   sending a network configuration request to a resource manager of the network infrastructure;
   wherein sending a network configuration request to the determined resources of the network infrastructure is based on the network configuration request to a resource manager of the network infrastructure.

3. The method according to claim 1, wherein the determination of servers to be allocated and of resources of the network infrastructure enabling connectivity between the servers based on the request to instantiate the virtualized functions comprises, in order:
   receiving, by the resource orchestrator, a status of the network infrastructure;
   determining servers to be allocated based on the status of the network infrastructure received, the status of the network infrastructure enabling connectivity between the servers based on the request to instantiate the virtualized functions; and
   determining resources of the network infrastructure enabling the connectivity.

4. The method according to claim 1, wherein at least one of the determined servers is at least one of a computation server and a data storage server and a user terminal.

5. The method according to claim 1, wherein the network status comprises information relating to at least one of network link load and computing load and information about connectivity between servers.

6. The method according to claim 1, wherein the instantiation request comprises a request for at least one of availability, computing power, throughput and latency.

7. The method according to claim 1, wherein the connectivity is information about at least one of bandwidth, latency, security level, and quality of service.

8. The method according to claim 1, wherein the servers to be allocated and the resources are determined according to a network link load or a computing load.

9. A device for allocating resources of a network infrastructure in order to provide a telecommunication service, wherein the device comprises:
   a communication interface configured to receive a request to instantiate virtualized functions on virtual machines associated to servers, each server comprising a physical computing device;
   an electronic circuit configured to determine the servers to be allocated, based on the instantiation request;
   an electronic circuit configured to determine resources of the network infrastructure enabling optimal connectivity between the servers, based on the instantiation request and on the determined servers, wherein at least one of the determined resources of the network infrastructure comprises at least one of a firewall, a switch and a router;
   a communication interface configured to send, to the determined resources, a network configuration request enabling connectivity between the determined servers; and
   a communication interface configured to send, to the determined servers, a request to allocate computing capacity on the determined servers.

10. A processing circuit comprising a processor and a memory, the memory storing code instructions of a computer program for implementing the method according to claim 1, when this program is executed by the processor.

* * * * *